July 19, 1955     W. H. PAULSTICH     2,713,318
SCALE INDICATING MEANS
Filed July 15, 1954                                    2 Sheets-Sheet 1
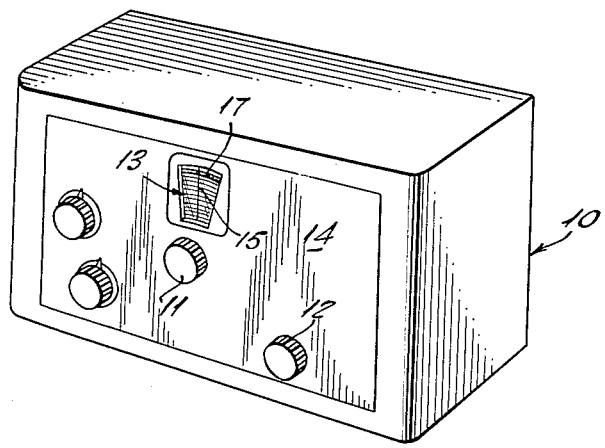
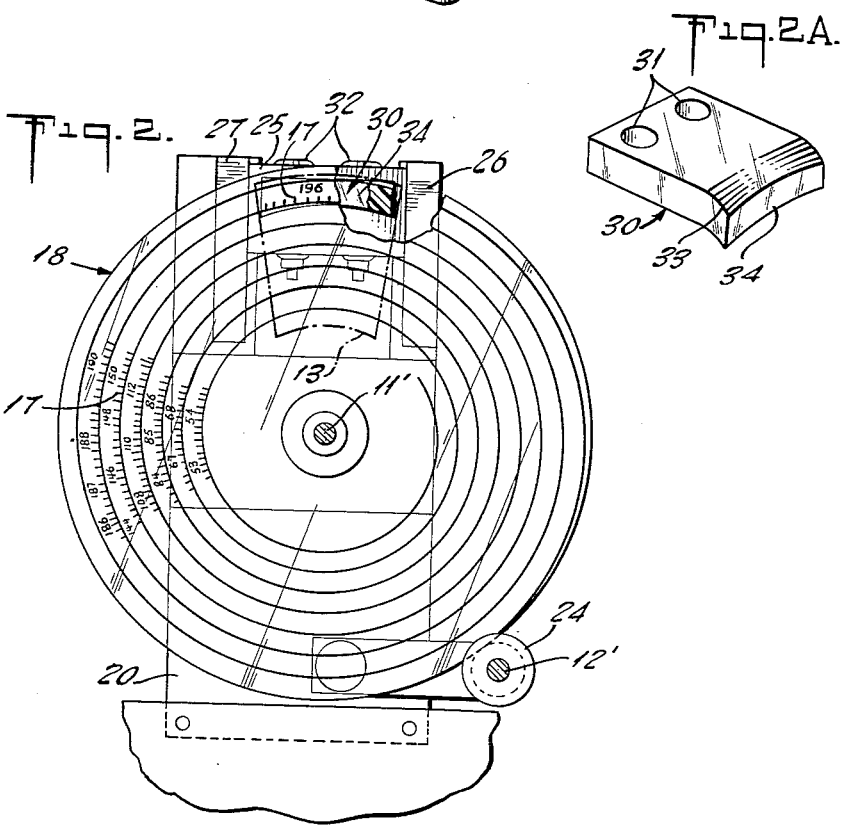
INVENTOR
WILLIAM H. PAULSTICH
BY
Mitchell & Bechert
ATTORNEYS July 19, 1955 W. H. PAULSTICH 2,713,318
SCALE INDICATING MEANS
Filed July 15, 1954 2 Sheets-Sheet 2
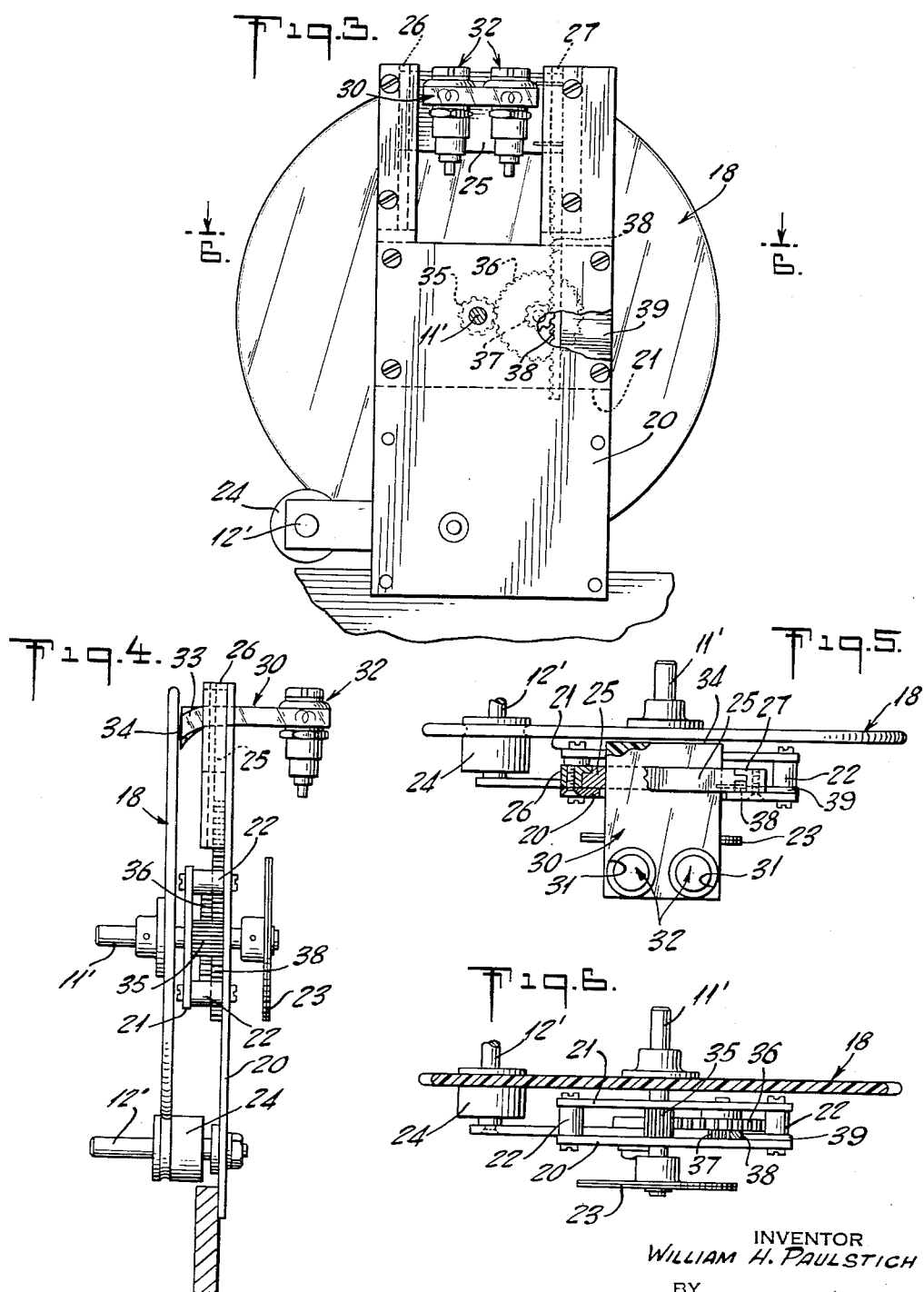
INVENTOR
WILLIAM H. PAULSTICH
BY
Mitchell & Bechert
ATTORNEYS United States Patent Office 2,713,318
Patented July 19, 1955

2,713,318

SCALE INDICATING MEANS

William H. Paulstich, Merrick, N. Y., assignor to Servo Corporation of America, New Hyde Park, N. Y., a corporation of New York Application July 15, 1954, Serial No. 443,498

5 Claims. (Cl. 116—124.4)

My invention relates to an improved dial-indicator construction, as of the type employed in radio receivers, signal generators, and other devices requiring variable setting of a circuit element or the like.

It is an object of the invention to provide an improved device of the character indicated.

It is another object to provide an improved dial characterized by greater ease of interpretation of dial setting.

It is a specific object to provide an easily read and interpreted dial for applications in which more than one turn of the dial is necessary to cover the range of continuous adjustment of the circuit element or the like varied thereby.

It is a general object to meet the above objects with a simple construction that is relatively foolproof and which involves reduced bulk as compared with previous arrangements.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Fig. 1 is a perspective view of a cabinet including a variably tunable circuit element controlled by dial means incorporating features of the invention;

Fig. 2 is an enlarged front elevation, partly broken away and showing the dial assembly behind the front panel of the cabinet of Fig. 1;

Fig. 3 is a rear elevation of the assembly of Fig. 2;

Fig. 4 is a right-end elevation of the assembly of Fig. 2;

Fig. 5 is a top view of the assembly of Fig. 2 and is partly broken away to reveal certain details of construction; and Fig. 6 is a view similar to Fig. 5, except that it is taken in the plane 6—6 of Fig. 3, so as to illustrate certain parts located beneath those shown in full in Fig. 5.

Briefly stated, my invention contemplates an improved dial and indicator construction particularly applicable to the interpretation of multi-turn scales, as, for example, a continuous multiple-turn frequency scale in a wide-band radio receiver. To eliminate any possibility of ambiguity in the interpretation of this scale as between the respective turns, I provide directional illuminating means, illuminating substantially only the turn (or only a part of the turn) of immediate concern. The illuminating assembly is complete with source of light and with directional projecting means and is bodily displaced in synchronism with rotation of the tuning shaft. The displacement is radial and is so geared to the pitch of the scale as continuously to follow the scale.

Referring to the drawings, my invention is shown in application to a cabinet 10, which may be a radio-frequency tuner having a coarse-tuning knob 11 and a fine-tuning knob 12; the coarse-tuning knob may provide quick shifting over widely spaced bands within the continuously tunable range of the device, and the fine-tuning knob 12 is available for precise location of a desired frequency. The tuning indication may be observed through a window 13 on the front panel 14 and, to locate the exact frequency, a fixed hairline 15 may be inscribed on the window glass, or otherwise supported centrally in the opening 13. The dial of the invention is visible through the window 13 in Fig. 1.

In accordance with the invention, I provide a continuously developed helical or spiral scale 17 on the dial plate 18, and I so control the limited illumination of the scale 17 that, at any one time, essentially only one turn or a part of one turn is flooded with light; localized illumination of a part of scale 17 is suggested by heavier inking within window 13 on both Figs. 1 and 2. In the form shown, the dial 18 is translucent, and it is convenient to project the localized light from the back side of the dial and, therefore, from the back side of the front panel 14. Of course, in order to cover the full range, the effective radial height of the window opening 13 should correspond to the full radial development of the scale 17. The dial 18 may be carried for rotation with the shaft 11', which is driven by the coarse-tuning dial 11. This shaft may be journaled in frame means, including a base plate 20 and an auxiliary plate 21, fixedly spaced therefrom by means 22.

In order to suggest the connection of shaft 11 to a variably tunable element, I have shown a coupling member 23 carried by the rearwardly projecting end of the coarse-tuning shaft 11'. For fine-tuning purposes, the shaft 12', driven by knob 12, may carry a drive wheel 24 having frictional edge engagement with the rim of the dial or indicator plate 18, as will be understood.

In accordance with a feature of the invention, the means for illuminating the localized area of interest on the scale 17 is a complete, simple subassembly, bodily movable in synchronized relation with rotation of the dial 18. This assembly is based in a crosshead or slide 25, which in turn is guided in spaced ways 26—27, so as to provide substantially pure radial movement for the slide 25 with respect to the tuning shaft 11', i. e. with respect to the axis of the helix or spiral of the dial. The light-projecting means may comprise a slab 30 of transparent material having an opening or openings 31 for reception of one or more lamps 32 and for positioning these lamps permanently to provide edge-lighted flooding of the interior of the slab 30. The slab may be of Lucite or the like and is shown extending rearwardly of the slide 25 and passing through the body of the slide 25 to a specially formed, projecting end 33, having an edge surface 34 as closely adjacent as feasible to the back side of the translucent dial 18. The edge 34 is preferably so contoured as to localize the area of illumination behind the scale 17, and I have found that, by warping the end 33 of an otherwise regular rectangular prismatic slab of Lucite or the like, a suitable arc may be defined for the edge 34, said arc being of radial thickness substantially corresponding to the pitch of the helix or spiral and of width representing a segment of one turn of the same, said segment being at least as wide as the widest part of the window opening 13.

The mechanism for driving the slide 25 may involve a reduction-gear train 35—36, followed by a pinion 37 meshing with a rack 38, fixed to and therefore forming part of the slide 25; the drive pinion 35 may be fixed to the drive shaft 11'. By properly designing the gear ratio at 35—36 and at 37—38, the localized illumination available behind the scale 17 may always track the helix or spiral of the scale 17.

It will be seen that I have described a relatively simple mechanism involving minimum bulk and yet maximum ease of interpretability of a dial setting. There is never any need to index illuminated sectors in accordance with shifted bands or tuned ranges, because, as indicated above, the source of illumination continuously and automatically tracks the helix or spiral. By providing the localized illumination of a width substantially equal to the pitch of the helix, I avoid ambiguity in reading against the correct turn of the scale.

While I have described the invention in detail for the preferred form shown, it will be understood that modifications may be made within the scope of the invention as defined in the claims which follow.

I claim:

1. In combination, a multiple-turn dial scale, a light-projection assembly, guide means guiding said assembly for radial movement with respect to said scale, said assembly including a source of light, a body of light-conduting material having an edge exposed to light from said source and having a further edge casting light from said source onto said scale, said further edge being of substantially uniform thickness approximating the pitch between turns of said scale and of width representing a limited segment of one turn of said scale, said segment extending over a range of adjacent indications on a turn of said scale.

2. In combination, a frame, including a panel having a window through which tuning indications may be observed, a tuning shaft journaled in said frame on an axis offset from said window, a translucent tuning dial carried for rotation with such shaft and having inscribed thereon a continuous multiple-turn scale, corresponding extensive arcuate segments of all turns of said dial scale being continuously exposed through said window, said frame including radially directed guide means located behind said dial, and oriented for guiding in the direction of offset of said window with respect to said axis, an illuminating assembly guided by said guide means and including directional light-projecting means limited to illuminate from behind said dial substantially only one segment of one turn of said scale at any one time, said segment extending substantially the full arcuate extent of exposure through said window, and means synchronizing radial displacement of said projecting means along said guide means with rotation of said shaft in such manner that the directionally projected light continuously follows said scale.

3. The combination of claim 2 in which said light-projecting means includes a transparent slab having an opening therein, a lamp positioned in said opening to edge-light and, therefore, to flood the interior of said slab, said slab having an edge immediately adjacent the back side of said dial and contoured to project light directionally on substantially the full segment of one turn of said scale, as exposed through said window.

4. The combination of claim 3 in which said slab has a further opening and in which a second lamp is positioned in said further opening to edge-light and, therefore, more intensely flood the interior of said slab.

5. The combination of claim 3 in which substantially all the exterior surface of said slab is opaquely covered except for that edge surface immediately facing the back side of said dial.

References Cited in the file of this patent

UNITED STATES PATENTS

| | | |
|---|---|---|
| 2,575,856 | Ware | Nov. 20, 1951 |
| 2,612,133 | Crawford | Sept. 30, 1952 |
| 2,672,116 | Gunderson | Mar. 16, 1954 |